Sept. 4, 1934. R. C. REBOUL ET AL 1,972,600
DEVICE FOR THE PRODUCTION OF ARTIFICIAL SMOKE
Filed July 29, 1933 4 Sheets-Sheet 1

Raoul Celestin Reboul
Pierre Boissou
INVENTORS

Sept. 4, 1934.  R. C. REBOUL ET AL  1,972,600
DEVICE FOR THE PRODUCTION OF ARTIFICIAL SMOKE
Filed July 29, 1933  4 Sheets-Sheet 3

Raoul Celestin Reboul
Pierre Boissou
INVENTORS

Sept. 4, 1934. R. C. REBOUL ET AL 1,972,600
DEVICE FOR THE PRODUCTION OF ARTIFICIAL SMOKE
Filed July 29, 1933 4 Sheets-Sheet 4

Raoul Celestin Reboul
Pierre Boissou
INVENTORS.

their Attorney

Patented Sept. 4, 1934

1,972,600

UNITED STATES PATENT OFFICE 1,972,600

DEVICE FOR THE PRODUCTION OF ARTIFICIAL SMOKE

Raoul Célestin Reboul, Paris, and Pierre Boissou, Pont-a-Mousson, France, assignors to Societe Anonyme des Hauts-Fourneaux et Fonderies de Pont-a-Mousson, Pont-a-Mousson, France Application July 29, 1933, Serial No. 682,800 In France August 6, 1932

6 Claims. (Cl. 252—1)

Processes for the production of artificial smoke by means of oil of vitriol acting upon a substance causing a great disengagement of heat, for instance lime, or more simply, water, have been known for a long time.

These processes offer two drawbacks:

1. The smoke thus obtained is very acid this quality being prejudicial in the majority of cases.
2. The acid is readily congealable, and thus in winter the process can only be employed with difficulty. The process in conformity with the invention is chiefly characterized in that it consists: in sending into the smoke at its point of formation, a stream of a gas adapted to form sulphate of ammonia with the acid contained in the smoke and to permit of obtaining a non-acid cloud of smoke.

According to another feature, sulphur chloride is mixed with the acid, and this lowers the freezing point of this latter without reducing its smoke disengaging properties.

By way of example, it may be noted that a proportion of 40 per cent of sulphur chloride and 60 per cent of oil of vitriol will produce good results.

The invention further relates to an apparatus for carrying the said process into effect, and particularly for assuring a supply of ammonia at the point of formation of the smoke, and if necessary, the simultaneous and automatic control of the ammonia gas relatively to the quantity of cloudy substance which is formed.

Obviously the produced smokes and fumes may be used as fogs or concealing means for ships and the like, as protecting means for plants, and for analogous applications.

The accompanying drawings show by way of example various forms of the said apparatus.

The apparatus in conformity with the invention essentially consists of a plurality of vessels 1 which contain a certain quantity of oil of vitriol and are pivotally mounted on journals 2. The centre of gravity G of these vessels, when they contain their specified amount of liquid, is situated above the journals and outside of the vertical plane thereof. Thus the vessels 1 will constantly tend to pivot forwardly as soon as the fastening means provided for the purpose have been released. In the device shown in Fig. 1, the fastening is effected simply by a strip 3, located in the rear of the frame upon which the vessel is mounted.

Figure 4:
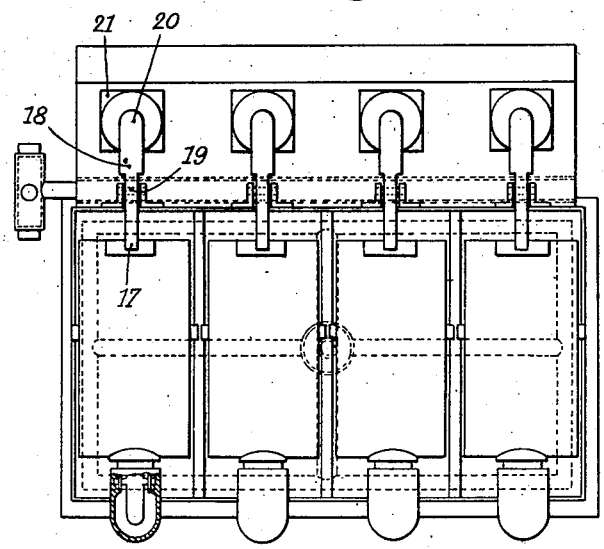

Each vessel 1 is provided at the top with a plug comprising a device which is adapted to break upon receiving a shock, such as a glass chamber which is more particularly shown in Fig. 4. The pivoting movement is stopped at the moment when the internal generatrix of the cylinder (in the case of Figs. 1 and 2) forms with the horizontal plane the optimum angle for the outflow of the oil of vitriol, which is in the viscous state. This stopping is preferably assured by the spout 6 itself, through which the liquid is supplied to the vat containing lime or other material adapted to disengage a great quantity of heat by the contact with the oil of vitriol. In the apparatus shown in Figs. 1 and 2, the said vat 7 is located at a certain distance in front of the vessel, and above it is situated a kind of sheave provided with a funnel 8 connected with a set of tubes 9, these tubes having a radial position and being perforated upon their entire length, in order to ensure a regular distribution of the acid upon the lime.

The whole above described arrangement may rest upon a roller race in such way that it may be placed in a favorable direction with regard to the wind. The output is maximum when the direction of the wind coincides with the longitudinal axis of the spout 6. It will be observed, on the other hand, that the lime vat 7 will be normally covered, below the set of radial tubes, by a suitable device which can be readily removed.

Figure 1:
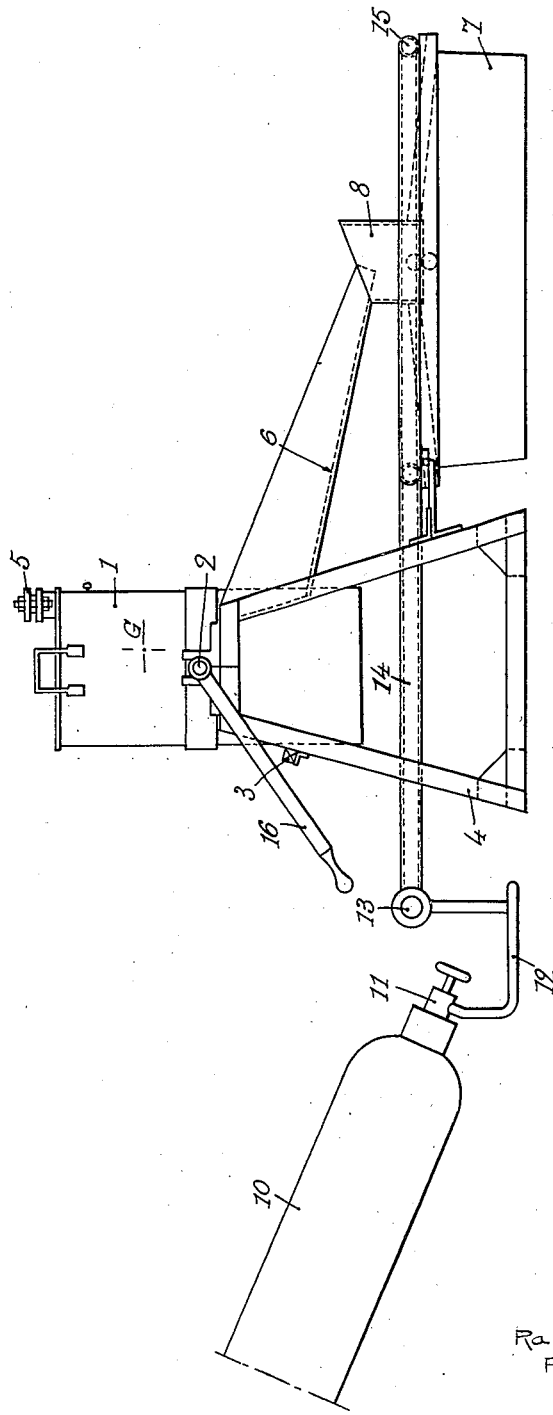
Fig. 1 is an elevational view of an apparatus adapted for manual control.
Figure 2:
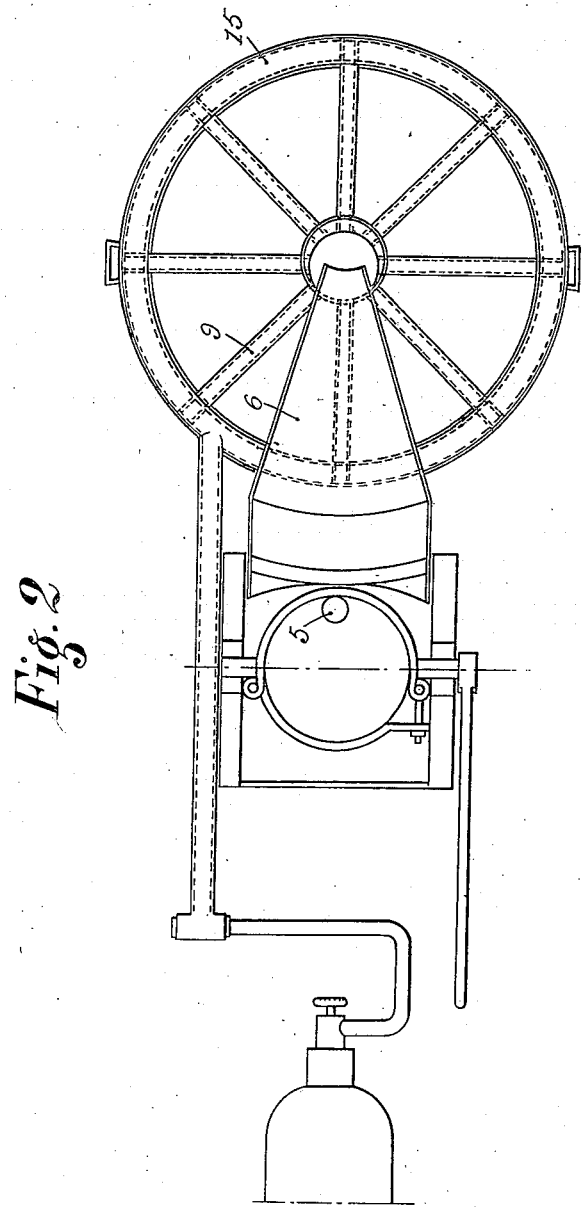
Fig. 2 is a corresponding plan view.

The principal improvement according to the invention consists in the use, in combination with the above-described plant, of a cylinder or like vessel 10 containing ammonia and provided with a combined reducing valve and pressure gauge 11 of any suitable type, which is adapted to regulate the pressure of the discharge and is connected by a suitable piping to the place at which the acid fumes are given off. In the case of Figs. 1 and 2, the piping consists of a flexible hose 12 connected to a controlling cock 13, this latter being in turn connected with a tube 14 communicating with a ring 15 which is perforated upon its entire periphery in order to afford a regular mixture with the acid fumes.

In the apparatus shown in Figs. 1 and 2, the controlling operations are entirely manual. The vessels 1 are operated by a lever 16, and the cock 13 is also subject to manual control.

Figure 3:
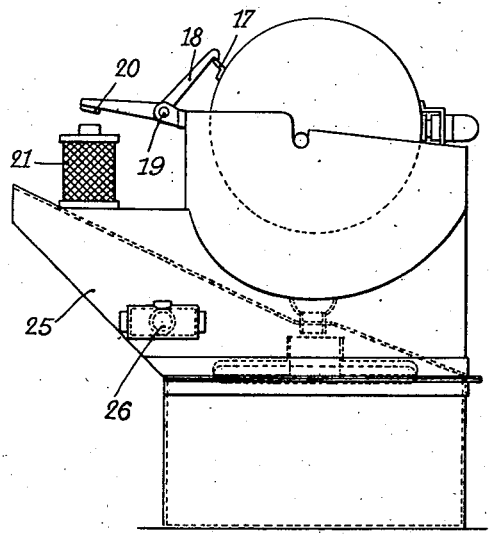
Figs. 3 and 4 are analogous views of an automatic apparatus.
Figure 5:
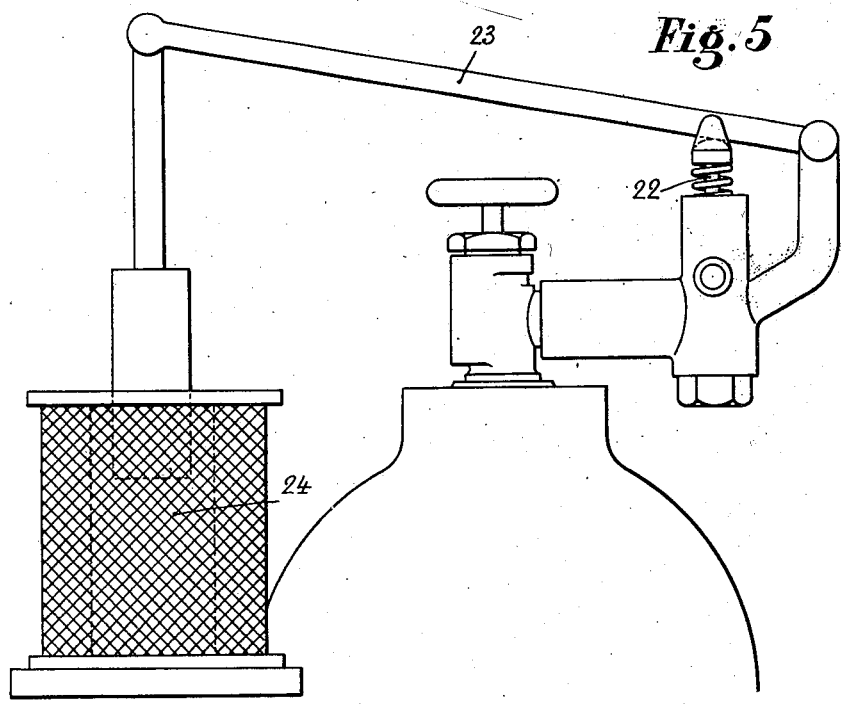
Figs. 5 and 6 are views on a larger scale showing the arrangement for the control of the gas supply.
Figure 6:
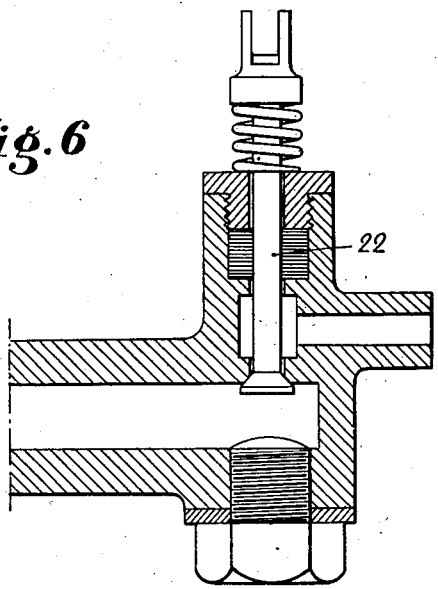

Figs. 3 and 4 show another form of construction in which the control of the tipping of the vessel and of the supply of ammonia is preferably effected at the same time and in an automatic manner by means of electric controlling devices. In these figures, the vessels are held in their idle position by a stop 17 cooperating with a lever 18 pivoted at 19 on the vessel support and comprising a magnetic member 20 which may be acted upon by an electro-magnet 21. When the circuit of the electro-magnet is closed, the member 20 is attracted, and the stop 17 thus released. The corresponding arrangement for the discharge of the gas is shown in detail for the sake of clearness in Figs. 5 and 6. The discharge of gas is controlled by a valve 22 which is opened by the pivoting of a lever 23, acted upon, in the above mentioned conditions, by another electro-magnet 24. Both of said electromagnets may be inserted in a single electric circuit.

Obviously, in the case of a battery of several acid containing vessels, the electric controls will be so arranged as to ensure, at each closing of the circuit, the pivoting of a vessel and the corresponding discharge of a cloud of ammonia gas. Means may be further provided by which the duration of the supply of ammonia will be proportional to the charge of either vessel, this charge not being necessarily complete.

Obviously, the invention is not limited to the forms of construction herein represented, which are given solely by way of example.

It will be observed in particular that Figs. 3 and 4 show another arrangement of the acid vessels with reference to the lime vat, and herein the said vessels have a spherical form. They discharge into a vat situated adjacent the centre of the sphere, while on the contrary, the fumes are discharged laterally in the direction determined by the hood 25, the ammonia gas being circulated across the said hood in a tube 26.

Having now described our invention what we claim as new and desire to secure by Letters Patent is:

1. A plant for the production of artificial fumes or smokes comprising, in combination, at least one acid containing and pivotally mounted vessel, said vessel being so arranged as to have a tendency to pivot under the action of its own weight in order to discharge the acid contained, a container disposed under said vessel for receiving the acid and containing a substance adapted to produce fumes when being mixed up with the said acid, locking means for preventing the said vessel to pivot not in due time, and another container containing a gas for neutralizing the acidity of the said fumes, and means for connecting said second container with the spot where the fumes are produced.

2. A plant for the production of artificial fumes or smokes comprising, in combination, at least one acid containing and pivotally mounted vessel, said vessel being so arranged as to have a tendency to pivot under the action of its own weight in order to discharge the acid contained, a container disposed under said vessel for receiving the acid and containing a substance adapted to produce fumes when being mixed up with the said acid, locking means for preventing the said vessel to pivot not in due time, and another container containing a gas for neutralizing the acidity of the said fumes, tubular perforated means of a preferably circular shape located above said first container and further means connecting said perforated means with said second container.

3. In a plant according to claim 1, means for simultaneously releasing said locking means and opening of said neutralizing gas container.

4. In a plant according to claim 1, wherein said locking means comprise an oscillating lever and a stop on said vessel cooperating with one end of said lever in order to immobilize this vessel, an electromagnet disposed adjacent the second end of said lever and releasing said vessel when causing the oscillation of said lever and preferably operatively connected to said gas container in order to control the gas discharge.

5. A plant for the production of artificial smokes or fumes, comprising at least one acid containing and pivotally mounted vessel, said vessel being so disposed as to have a tendency to pivot under its own weight and to discharge the acid, a support upon which said vessel is mounted, a container disposed below said vessel containing a substance adapted to produce smokes when mixed up with the acid and receiving the discharged acid, stop means on said vessel, an oscillating lever pivotally mounted on said support and cooperating with said stop means in order to immobilize said vessel, a second container, containing a gas for neutralizing the acidity of said fumes, discharge means on said second container connecting it with said first container, and electromagnets preferably simultaneously acting on said lever in order to release said vessel and on said discharge means in order to open them.

6. A plant for the producing of fumes and smokes, comprising a number of preferably spherical acid containing vessels, a support for pivotally supporting said vessels in such a manner that they should have a tendency to pivot under their own weight so as to discharge their acid contained, means for locking said vessels and preventing their pivoting not in due time, a lime container disposed below said vessels and adapted to receive said acid, tubular means for distributing said acid discharge in said lime container, a lateral hood on said lime container for directing the produced fumes, tubular discharge means in said hood, a second container containing a gas for neutralizing the acidity of the fumes and means for connecting said second container with said discharge means.

RAOUL CÉLESTIN REBOUL
PIERRE BOISSOU.